(12) United States Patent
Sanae (10) Patent No.: US 10,618,355 B2
(45) Date of Patent: Apr. 14, 2020

(54) PNEUMATIC TIRE

(71) Applicant: Sumitomo Rubber Industries, Ltd., Kobe-shi, Hyogo (JP)

(72) Inventor: Ryuhei Sanae, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 372 days.

(21) Appl. No.: 15/449,095

(22) Filed: Mar. 3, 2017

(65) Prior Publication Data

US 2017/0253086 A1 Sep. 7, 2017

(30) Foreign Application Priority Data

Mar. 4, 2016 (JP) .................................. 2016-042416

(51) Int. Cl.
*B60C 11/03* (2006.01)
*B60C 11/12* (2006.01)

(52) U.S. Cl.
CPC ...... *B60C 11/0304* (2013.01); *B60C 11/0306* (2013.01); *B60C 11/124* (2013.01); *B60C 11/1236* (2013.01); *B60C 11/1263* (2013.01); *B60C 2011/0353* (2013.01); *B60C 2011/0365* (2013.01); *B60C 2011/0369* (2013.01); *B60C 2011/1209* (2013.01)

(58) Field of Classification Search
None
See application file for complete search history.

(56) References Cited

U.S. PATENT DOCUMENTS

| | | | | |
|---|---|---|---|---|
| 5,031,680 A | * | 7/1991 | Kajikawa | ................ B60C 11/11 |
| | | | | 152/209.18 |
| D400,139 S | * | 10/1998 | Koenigstein | ................. D12/600 |
| 2013/0133797 A1 | * | 5/2013 | Takagi | .................... B60C 11/03 |
| | | | | 152/209.8 |
| 2015/0075686 A1 | | 3/2015 | Suga | |
| 2016/0009141 A1 | * | 1/2016 | Suga | ................... B60C 11/0083 |
| | | | | 152/209.9 |

FOREIGN PATENT DOCUMENTS

| | | | | | |
|---|---|---|---|---|---|
| JP | | 63137003 A | * | 6/1988 | ........ B60C 11/1263 |
| JP | | 2002046426 A | * | 2/2002 | |
| JP | | 2006103522 A | * | 4/2006 | |
| JP | | 2007161123 A | * | 6/2007 | |
| JP | | 2013-224132 A | | 10/2013 | |

\* cited by examiner

*Primary Examiner* — Peter L Vajda
*Assistant Examiner* — Asha A Thomas
(74) *Attorney, Agent, or Firm* — Birch, Stewart, Kolasch & Birch, LLP (57) ABSTRACT

A pneumatic tire comprises a tread portion 2 having an outside tread edge Teo and an inside tread edge Tei to be positioned outside and inside, respectively, with respect to a vehicle. The tread portion 2 is axially divided into land regions 4 by four main grooves 3 including an outside shoulder main groove 5, an inside shoulder main groove 6 and two crown main grooves 7. The outside shoulder main groove 5 has a width smaller than the inside shoulder main groove 6 and the crown main grooves 7. The land portions 4 include an inside shoulder land region 10 provided with inside shoulder lateral grooves 17. Each of the land regions 4 is provided with sipes 20 each extending across the entire width of the land region and having a width less than 3 mm.

16 Claims, 9 Drawing Sheets

PNEUMATIC TIRE

TECHNICAL FIELD

The present invention relates to a pneumatic tire, more particularly to an asymmetrical tread pattern capable of improving wet performance, steering stability and ride comfort in a good balance.

BACKGROUND ART

Japanese Patent Application Publication No. 2013-224132 discloses a pneumatic tire whose mounting position on the vehicle is specified with regard to a tread pattern provided in the tread portion. The tread pattern includes an inside shoulder land region abutting on the inside tread edge to be positioned on the inside with respect to a vehicle, and the inside shoulder land region is provided with lateral grooves extending axially inwardly from the inside tread edge and terminating within the inside shoulder land region. Such lateral grooves expedite drainage from the inside shoulder land region, while suppressing the decrease in the rigidity of the inside shoulder land region due to the lateral grooves.
Such pneumatic tire has room for improvement in the ride comfort.

SUMMARY OF THE INVENTION

The present invention was made in view of the problem described above, and it is a primary object of the present invention to provide a pneumatic tire in which, by providing lateral sipes in each land region in a particular manner, wet performance, steering stability and riding comfort can be improved in a good balance.

According to the present invention, a pneumatic tire comprises
- a tread portion having an outside tread edge and an inside tread edge to be positioned outside and inside, respectively, with respect to a vehicle,
- the tread portion provided with four main grooves extending straight continuously in the tire circumferential direction to axially divide the tread portion into five land regions,
- the four main grooves being an outside shoulder main groove adjacent to the outside tread edge, an inside shoulder main groove adjacent to the inside tread edge, an inside crown main groove adjacent to the inside shoulder main groove, and an outside crown main groove adjacent to the outside shoulder main groove,
- the five land regions being an inside shoulder land region between the inside tread edge and the inside shoulder main groove, an inside middle land region between the inside shoulder main groove and the inside crown main groove, a crown land region between the inside crown main groove and the outside crown main groove, an outside middle land region between the outside crown main groove and the outside shoulder main groove, and an outside shoulder land region between the outside shoulder main groove and the outside tread edge,
wherein
the outside shoulder main groove has a groove width smaller than groove widths of the inside shoulder main groove and the inside and outside crown main grooves, the inside shoulder land region is provided with a plurality of inside shoulder lateral grooves extending axially inwardly from the inside tread edge and terminating within the inside shoulder land region, and
each of the five land regions is provided with a plurality of sipes each extending across the entire width of the land region while having a width of less than 3 mm.

In the pneumatic tire according to the present invention, it is preferable that the crown land region is provided with no grooves having a width of 3 mm or more.

In the pneumatic tire according to the present invention, it is preferable that the sipes include a crown sipe disposed in the crown land region, and the crown sipe comprises a central portion inclined with respect to the tire axial direction to one direction, and an end portion extending from each end in the tire axial direction the central portion while inclining with respect to the tire axial direction to the opposite direction to the central portion.

In the pneumatic tire according to the present invention, it is preferable that the central portion comprises a shallow portion the depth of which is smaller than the above-said end portion.

In the pneumatic tire according to the present invention, it is preferable that the sipes include an inside middle sipe disposed in the inside middle land region, and
the inside middle sipe extends straight while inclining to the same direction as the above-said end portion of the crown sipe.

In the pneumatic tire according to the present invention, it is preferable that the inside middle sipe comprises an end portion connected to the inside shoulder main groove, an end portion connected to the crown main groove, and a central portion disposed between the end portions and including a shallow portion whose depth is less than those of the end portions.

In the pneumatic tire according to the present invention, it is preferable that the length of the central portion of the inside middle sipe is less than the length of the central portion of the crown sipe.

In the pneumatic tire according to the present invention, it is preferable that the end portion on the crown land region side, of the inside middle sipe and the end portion on the inside middle land region side, of the crown sipe are overlapped with each other in the tire circumferential direction.

In the pneumatic tire according to the present invention, it is preferable that the outside shoulder land region is provided with a plurality of outside shoulder lateral grooves extending between the outside tread edge and the outside shoulder main groove.

In the pneumatic tire according to the present invention, it is preferable that the sipes include an inside shoulder sipe disposed in the inside shoulder land region, and an outside shoulder sipe disposed in the outside shoulder land region,
the inside shoulder sipe comprises a shallow portion and a deep portion having a larger depth than the shallow portion,
the outside shoulder sipe comprises a shallow portion and a deep portion having a larger depth than the shallow portion,
in the inside shoulder sipe, the shallow portion is disposed on the inside tread edge side of the deep portion, and
in the outside shoulder sipe, the shallow portion is disposed on the outside shoulder main groove side of the deep portion.

In the pneumatic tire according to the present invention, it is preferable that the groove width of the outside shoulder main groove is not less than 0.2 times and not more than 0.6 times the groove width of the inside shoulder main groove, the groove width of the crown main grooves is not less than 2.0 times and not more than 3.0 times the groove width of the outside shoulder main groove, and the total of the groove widths of all of the main grooves is in a range from 0.27 to 0.33 times a tread width of the tread portion measured between the outside tread edge and the inside tread edge.

In the pneumatic tire according to the present invention, it is preferable that a distance in the tire axial direction from the axially inner end of each of the inside shoulder lateral grooves to the inside tread edge is not less than 0.70 times and not more than 0.85 times the width in the tire axial direction of the inside shoulder land region.

In the pneumatic tire according to the present invention, it is preferable that each of the inside shoulder lateral grooves has a depth gradually decreased toward its axially outer end, and comprises a main portion of which depth is smoothly changed, and an axially inner portion of which depth is changed rapidly in comparison with the main portion and which is positioned on the axially inside of the main portion.

In the pneumatic tire according to the present invention, it is preferable that the shallow portion of the central portion of said crown sipe opens at the tread to have an opening width, and the end portion of said crown sipe comprises a radially outer first portion which opens at the tread to have an opening width same as the opening width of the shallow portion, and a radially inner second portion extending radially inwardly from the first portion toward the bottom of the crown sipe while having a width smaller than the opening width of the shallow portion.

In the pneumatic tire according to the present invention, it is preferable that the outside shoulder sipes are inclined with respect to the tire axial direction in the same direction as outside middle sipes disposed in the outside middle land region so that each of the outside shoulder sipes and one of the outside middle sipes are arranged in a straight line or alternatively a smoothly slightly curved line.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like.

The tread edges Teo and Tei are the axial outermost edges of the ground contacting patch of the tire which occurs under the normally inflated loaded condition when the camber angle of the tire is zero.

The tread width TW is the width measured under the normally inflated unloaded condition, as the axial distance between the tread edges determined as above.

The term "sipe" used in this application means a cut and a fine groove whose widths are less than 3 mm.

DESCRIPTION OF THE PREFERRED EMBODIMENTS

The present invention can be applied to various pneumatic tires and suitably applied to pneumatic tires for passenger cars.

Taking a passenger car tire as an example, an embodiment of the present invention will now be described with reference to the accompanying drawings.

As well known in the art, a pneumatic tire comprises a tread portion 2 whose radially outer surface defines the tread, a pair of axially spaced bead portions mounted on rim seats, a pair of sidewall portions extending between the tread edges and the bead portions, a carcass extending between the bead portions through the tread portion and the sidewall portions, and a tread reinforcing belt disposed radially outside the carcass in the tread portion.

The pneumatic tire 1 according to the present invention is provided in the tread portion 2 with an asymmetrical tread pattern, and the mounting position of the tire on the vehicle is specified. Thus, the tread portion 2 has an outside tread edge Teo to be positioned away from the center of the vehicle body, and an inside tread edge Tei to be positioned close to the center of the vehicle body. For example, the sidewall portion to be located on outside when installed on the vehicle is provided with an indication representing "outside", and the sidewall portion to be located on inside is provided with an indication representing "inside".

Figure 1:
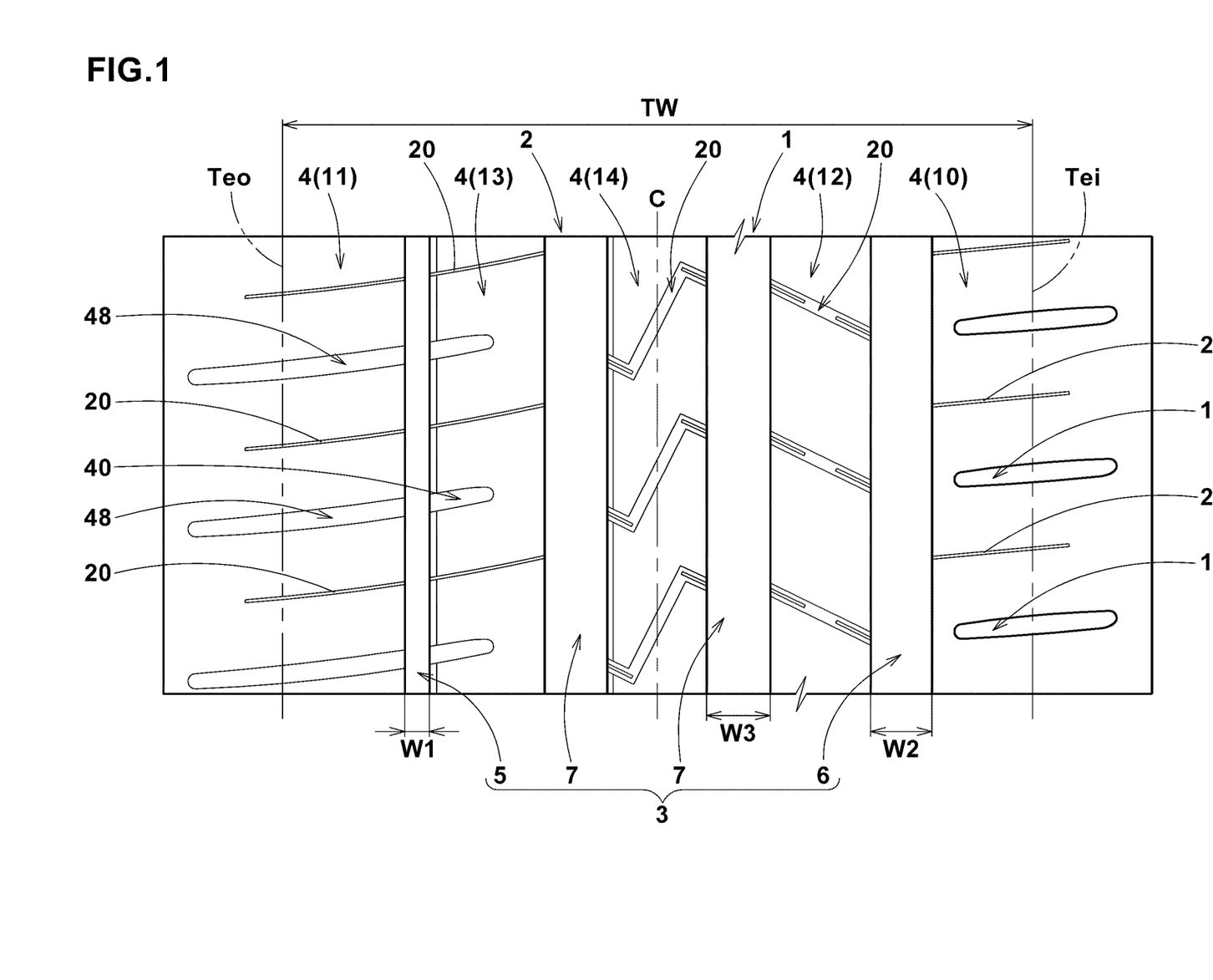
FIG. 1 is a developed partial view of the tread portion of a pneumatic tire as an embodiment of the present invention.

The tread portion 2 is provided with a plurality of main grooves 3 extending linearly continuously in the tire circumferential direction so that the tread portion 2 is axially divided into a plurality of land regions 4.

The main grooves 3 are an outside shoulder main groove 5 adjacent to the outside tread edge Teo, an inside shoulder main groove 6 adjacent to the inside tread edge Tei, and two crown main grooves 7 therebetween.

In this embodiment, the crown main grooves 7 are an inside crown main groove and an outside crown main groove disposed one on each side of the tire equator c.

The width W1 of the outside shoulder main groove 5 is set to be smaller than the widths of the inside shoulder main groove 6 and the crown main grooves 7 in order to relatively increase the land area and the tread rigidity on the outside tread edge Teo side of the tire equator than the inside tread edge Tei side and thereby to improve the steering stability.

The groove width W1 of the outside shoulder main groove 5 is preferably not less than 0.2 times, more preferably not less than 0.3 times, but preferably not more than 0.6 times, more preferably not more than 0.5 times the groove width W2 of the inside shoulder main groove 6 in order to improve the steering stability while maintaining the wet performance. In order to ensure this effect, preferably, the groove width W3 of the crown main grooves 7 is not less than 2.0 times and not more than 3.0 times the groove width W1 of the outside shoulder main groove 5.

The total of the groove widths of all of the main grooves 3 is preferably set in a range from 0.27 to 0.33 times the tread width TW in order to improve the steering stability and the wet performance in a good balance.

The land regions 4 are
an inside shoulder land region 10 defined between the inside tread edge Tei and the inside shoulder main groove 6,
an outside shoulder land region 11 defined between the outside tread edge Teo and the outside shoulder main groove 5,
an inside middle land region 12 defined between the inside shoulder main groove 6 and the inside crown main groove 7,
an outside middle land region 13 defined between the outside shoulder main groove 5 and the outside crown main groove 7, and
a crown land region 14 defined between the two crown main grooves 7.

Figure 2:
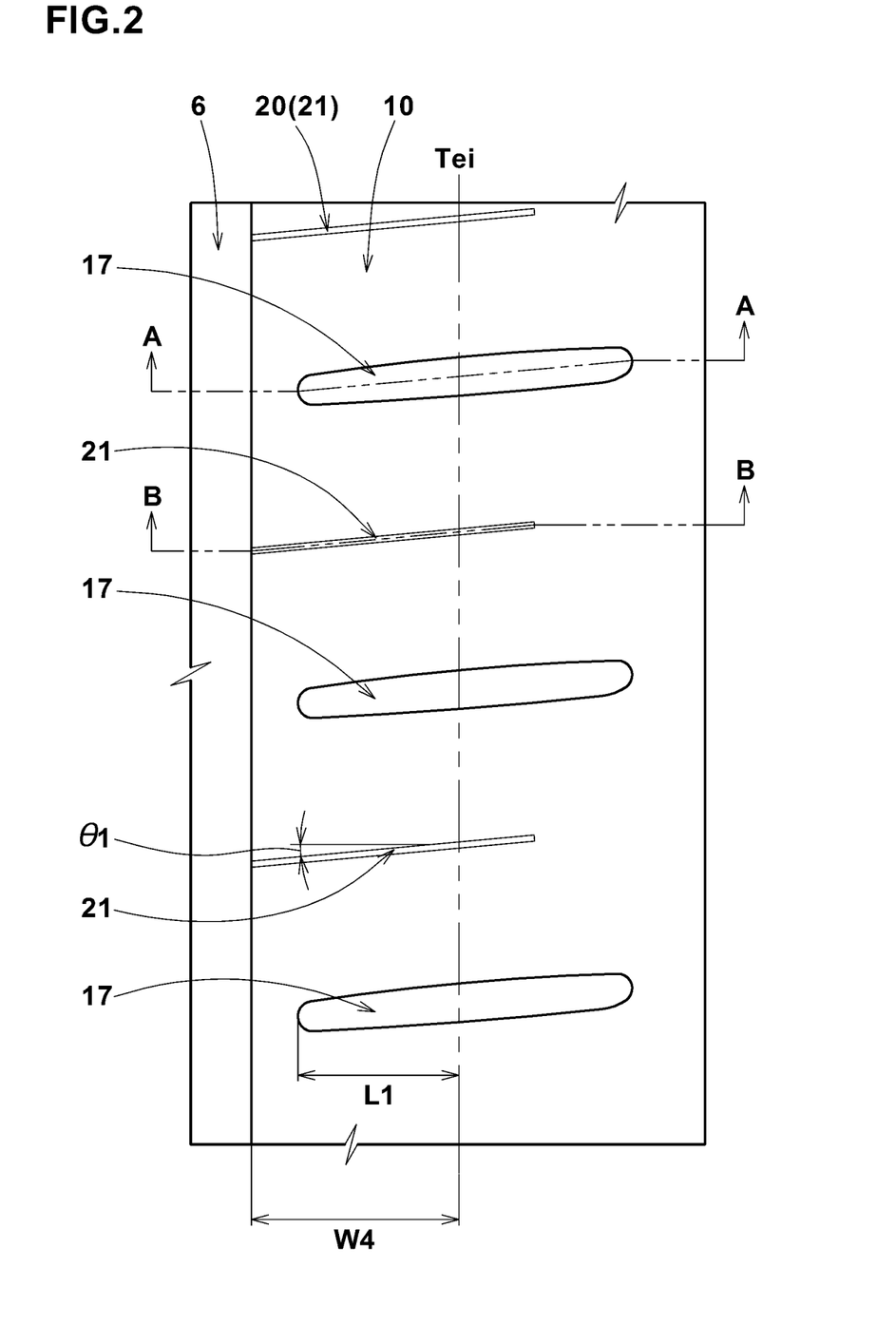
FIG. 2 is a partial top view of the inside shoulder land region in FIG. 1.

FIG. 2 shows a part of the inside shoulder land region 10. The inside shoulder land region 10 is provided with a plurality of inside shoulder lateral grooves 17 arraigned at intervals in the tire circumferential direction.
The inside shoulder lateral grooves 17 extend axially inwardly from the inside tread edge Tei, and terminate within the inside shoulder land region 10 without reaching to the inside shoulder main groove 6.
The inside shoulder lateral grooves 17 in this embodiment are arranged at an angle of from 0 to 10 degrees with respect to the tire axial direction. Such inside shoulder lateral grooves 17 improve the wet performance while preventing excessive decrease in the rigidity of the inside shoulder land region 10.
In order to enhance the wet performance and the steering stability in a good balance, the distance L1 in the tire axial direction from the axially inner end of each inside shoulder lateral groove 17 to the inside tread edge Tei is preferably not less than 0.70 times, more preferably not less than 0.75 times, but preferably not more than 0.85 times, more preferably not more than 0.80 times the width W4 in the tire axial direction of the inside shoulder land region 10.

Figure 3A:
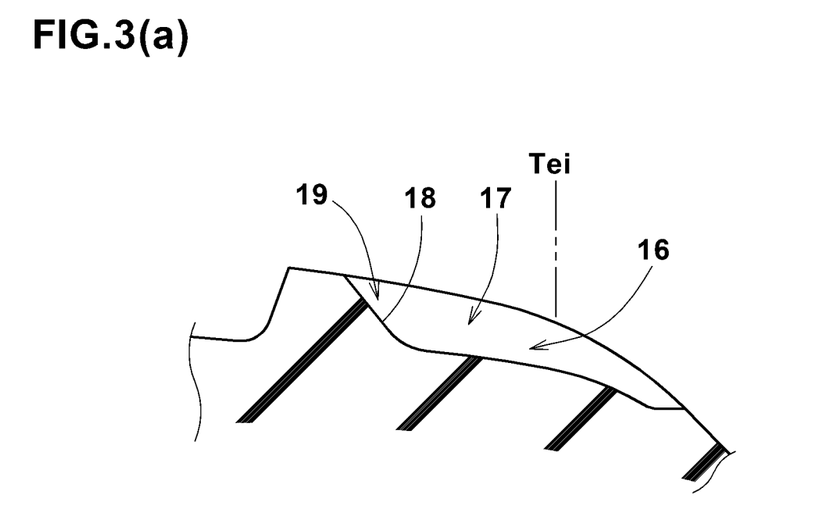
FIG. 3(a) is a cross-sectional view of an inside shoulder lateral groove taken along line A-A of FIG. 2.

FIG. 3(a) is a cross-sectional view taken along line A-A in FIG. 2 showing the depth of the inside shoulder lateral groove 17. As shown, the depth of the inside shoulder lateral groove 17 is gradually decreased toward its axially outer end. In this example, the inside shoulder lateral groove 17 has a main portion 16 of which depth is smoothly changed, and an axially inner portion 19 of which depth is changed rapidly in comparison with the main portion 16 and which is positioned on the axially inside of the main portion 16. The main portion 16 has the bottom surface inclined at an angle of more than 50 degrees, for example, 70 to 90 degrees with respect to the tire radial direction.
The axially inner portion 19 has the bottom surface 18 inclined at an angle of from 30 to 50 degrees with respect to the tire radial direction.
such axially inner portion 19 is preferred because it is possible to smoothen the distribution in the tire axial direction of the rigidity of the inside shoulder land region 10.

Each of the land regions 4 is provided with a plurality of sipes 20 extending across the entire width of the land region as shown in FIG. 1. Thereby, each land region is circumferentially divided, and the rigidity thereof is mitigated without deteriorating the steering stability. As a result, vibrations received from the road surface during running can be absorbed, and the ride comfort can be improved.

The sipes 20 in the inside shoulder land region 10 (hereinafter referred to as inside shoulder sipe 21) are alternated with the inside shoulder lateral grooves 17 in the tire circumferential direction as shown in FIG. 2.

Preferably, the inside shoulder sipes 21 extend straight while inclining with respect to the tire axial direction at an angle $\theta 1$ of from 5 to 10 degrees.

Figure 3B:
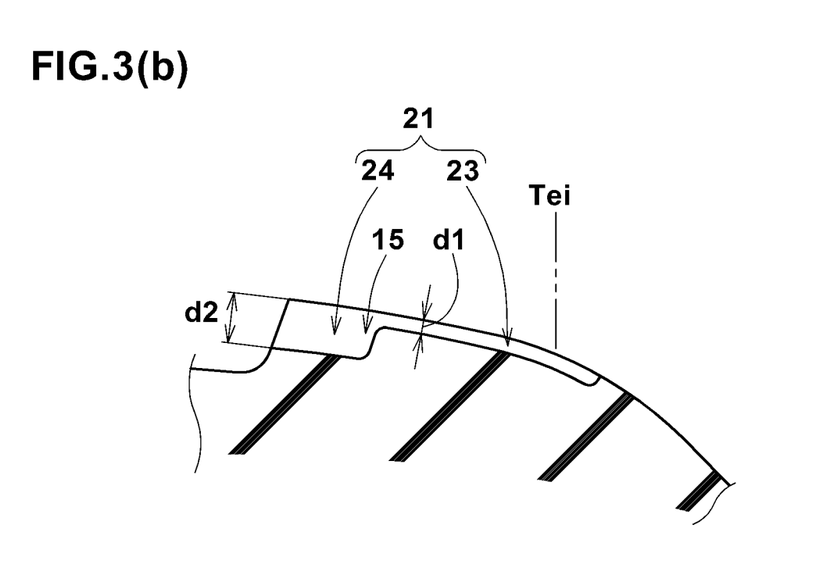
FIG. 3(b) is a cross-sectional view of an inside shoulder sipe taken along line B-B of FIG. 2.

FIG. 3(b) is a cross-sectional view taken along line B-B of FIG. 2 showing the depth of the inside shoulder sipe 21. As shown, the inside shoulder sipe 21 has a shallow portion 23 and a deep portion 24 having a depth larger than the shallow portion 23.

In this embodiment, the shallow portion 23 is provided on the inside tread edge Tei side of the deep portion 24. Such inside shoulder sipes 21 maintains the rigidity of the inside shoulder land region 10 in the vicinity of the inside tread edge Tei to prevent the steering stability from being deteriorated.

In this embodiment, it is preferable that the shallow portion 23 extends axially inwardly from the inside tread edge Tei at least to an axial position within the axial extent of the axially inner portion 19 of the inside shoulder lateral groove 17. Such shallow portion 23 can prevent the occurrence of abrupt change in the rigidity of the inside shoulder land region 10 and helps to achieve both the ride comfort and steering stability.

It is preferable that, between the shallow portion 23 and the deep portions 24, there is formed a depth suddenly changing portion 15 in which the depth is increased abruptly toward the axially inside of the tire. The depth suddenly changing portion 15 has an axial dimension smaller than the axial dimension of the axially inner portion 19 of the inside shoulder lateral groove 17. Such depth suddenly changing portion 15 can change the circumferential distribution of the rigidity of the inside shoulder land region 10 in cooperation with the inside shoulder lateral grooves 17. As a result, the impact sound generated from the inside shoulder land region when contacting with the road surface during running is changed to white noise.

In order to exhibit excellent riding comfort performance while maintaining the steering stability, the maximum depth d1 of the shallow portion 23 is preferably set in a range from 1.0 to 2.0 mm. The maximum depth d2 of the deep part 24 is preferably set in a range from 4.0 to 5.0 mm.

Figure 4:
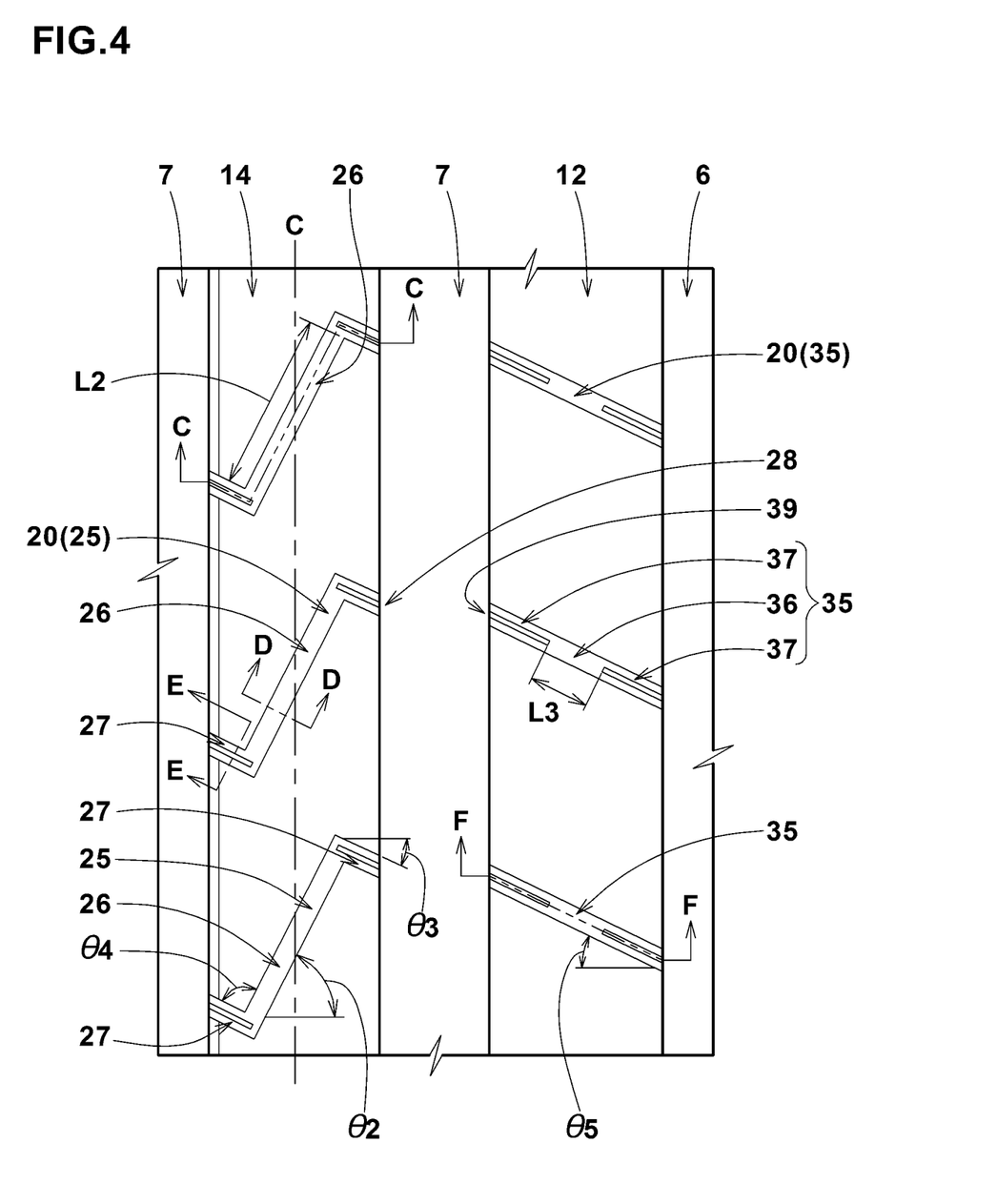
FIG. 4 is a partial top view of the crown land region and the inside middle land region in FIG. 1.

FIG. 4 shows a part of the crown land region 14 and a part of the inside middle land region 12.

The crown land region 14 and the inside middle land region 12 are provided with no grooves having a width of 3 mm or more. Only the sipes 20 are provided. Such crown land region 14 and inside middle land region 12 serve to exhibit excellent straight running performance and steering stability.

In this embodiment, the sipe 20 in the crown land region 14 (hereinafter referred to as crown sipe 25) has
a central portion 26 inclined with respect to the tire axial direction to one direction, and
both end portions 27 respectively extending from both ends of the central portion 26 while inclining with respect to the tire axial direction to the opposite direction to the central portion 26. The end portions 27 are opened to the respective crown main grooves 7. The edges of such crown sipe 25 can exert multidirectional frictional force.

In order to increase the frictional force in the tire axial direction, it is preferred that the central portion 26 is inclined at an angle θ2 in a range from 60 to 70 degrees with respect to the tire axial direction. It is preferable that the end portions 27 are inclined at an angle θ3 in a range from 15 to 25 degrees with respect to the tire axial direction. It is preferable that the angle θ4 between the central portion 26 and each end portion 27 is set in a range from 80 to 100 degrees.

Figure 5A:
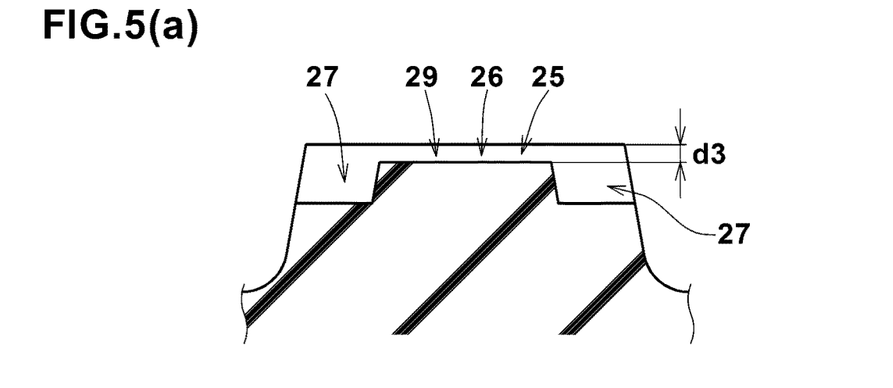
FIG. 5(a) is a cross-sectional view of the crown sipe taken along line C-C in FIG. 4.
Figures 5B, 5C:
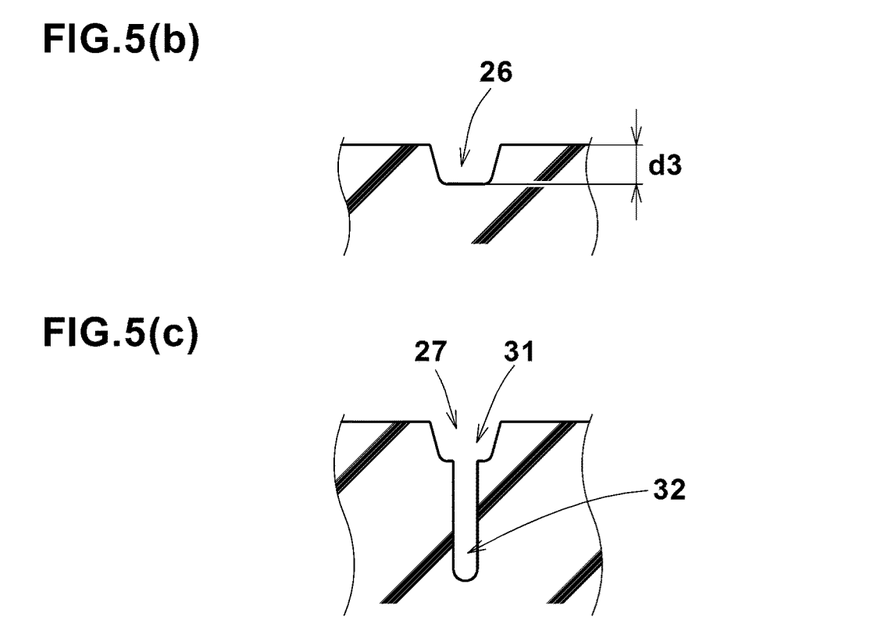
FIG. 5(b) is a cross-sectional view of the central portion of the crown sipe taken along line D-D in FIG. 4.
FIG. 5(c) is a cross-sectional view of an end portion of the crown sipe taken along line E-E in FIG. 4.

FIGS. 5(a) and 5(b) are a sectional view taken along line C-C of FIG. 4 and a sectional view taken along line D-D of FIG. 4, respectively. In the crown sipe 25, it is preferable that the end portions 27 have a larger depth, and the central portion 26 includes a shallow portion 29 whose depth is smaller than the end portions 27. For example, the maximum depth d3 of the shallow portion 29 is set in a range from 1.0 to 2.0 mm. Thereby, the rigidity of the crown land region 14 is better maintained, and thus excellent steering stability is exhibited.

FIG. 5(c) is a cross-sectional view taken along line E-E of FIG. 4 showing the end portion 27. As shown, in the depthwise direction, the end portion 27 in this example comprises a radially outer first portion 31 which opens at the tread and to have the opening width same as the shallow portion 29, and a radially inner second portion 32 extending radially inwardly from the first portion 31 toward the bottom and having a width smaller than the shallow portion 29. Thereby, vibrations of the crown land region 14 during running can be effectively absorbed.

The inside middle land region 12 is provided with at least one inside middle sipe 35 as shown in FIG. 4. In this embodiment, the inside middle sipes 35 are arranged at intervals in the tire circumferential direction. The inside middle sipes 35 in this example extend straight and are inclined at an angle θ5 of from 15 to 30 degrees with respect to the tire axial direction. Preferably, the inside middle sipes 35 are inclined with respect to the tire axial direction to the opposite direction to the central portions 26 of the crown sipes 25.

If land regions are provided with sipes only as in the crown land region 14 and the inside middle land region 12 in this embodiment, there is a possibility that noise sound generated when the siped portions contact with the road surface during running is increased. In this embodiment, as the crown sipes 25 and the inside middle sipes 35 have different configurations as described above, such noise sound is changed to white noise, and the noise performance can be improved.

Figure 5D:
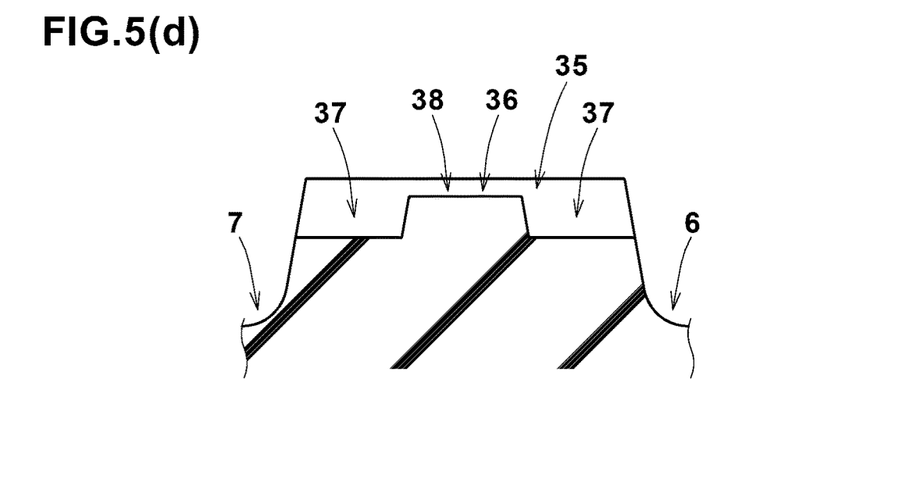
FIG. 5(d) is a cross-sectional view of the inside middle sipe taken along line F-F in FIG. 4.

FIG. 5(d) is a cross sectional view taken along line F-F of FIG. 4, namely, taken along the longitudinal direction of the inside middle sipe 35. As shown, in the longitudinal direction, the inside middle sipe 35 in this example comprises an end portion 37 opened to the inside shoulder main groove 6, an end portion 37 opened to the crown main groove 7, and a central portion 36 located between the end portions 37 and including a shallow bottom portion 38 having a depth smaller than each of the end portions 37. In this embodiment, each of the end portions 37 has a cross-sectional shape which is substantially same as the end portions 27 of the crown sipe 25, and the central portion 36 of the inside middle sipe 35 has a cross-sectional shape which is substantially same as the central portion 26 of the crown sipe 25.

As shown in FIG. 4, it is preferable that the length L3 of the central portion 36 of the inside middle sipe 35 is smaller than the length L2 of the central portion 26 of the crown sipe 25. Preferably, the length L3 is 0.25 to 0.45 times the length L2. Such inside middle sipes 35 can mitigate the rigidity of the inside middle land region 12 more than the crown land region 14. This may serve to improve the ride comfort.

It is preferable that, in the tire circumferential direction, the outer end 39 on the crown land region 14 side, of the inside middle sipe 35 is overlapped with the outer end 28 on the inside tread edge Tei side, of the crown sipe 25.
More specifically, the circumferential extent of the opening of the outer end 39 of each of the inside middle sipes 35 is at least partially overlapped with that of the outer end 28 of one of the crown sipes 25. Such arrangement can mitigate the total rigidity of the inside middle land region 12 and the crown land region 14, and it is possible to further improve the riding comfort.

Figure 6:
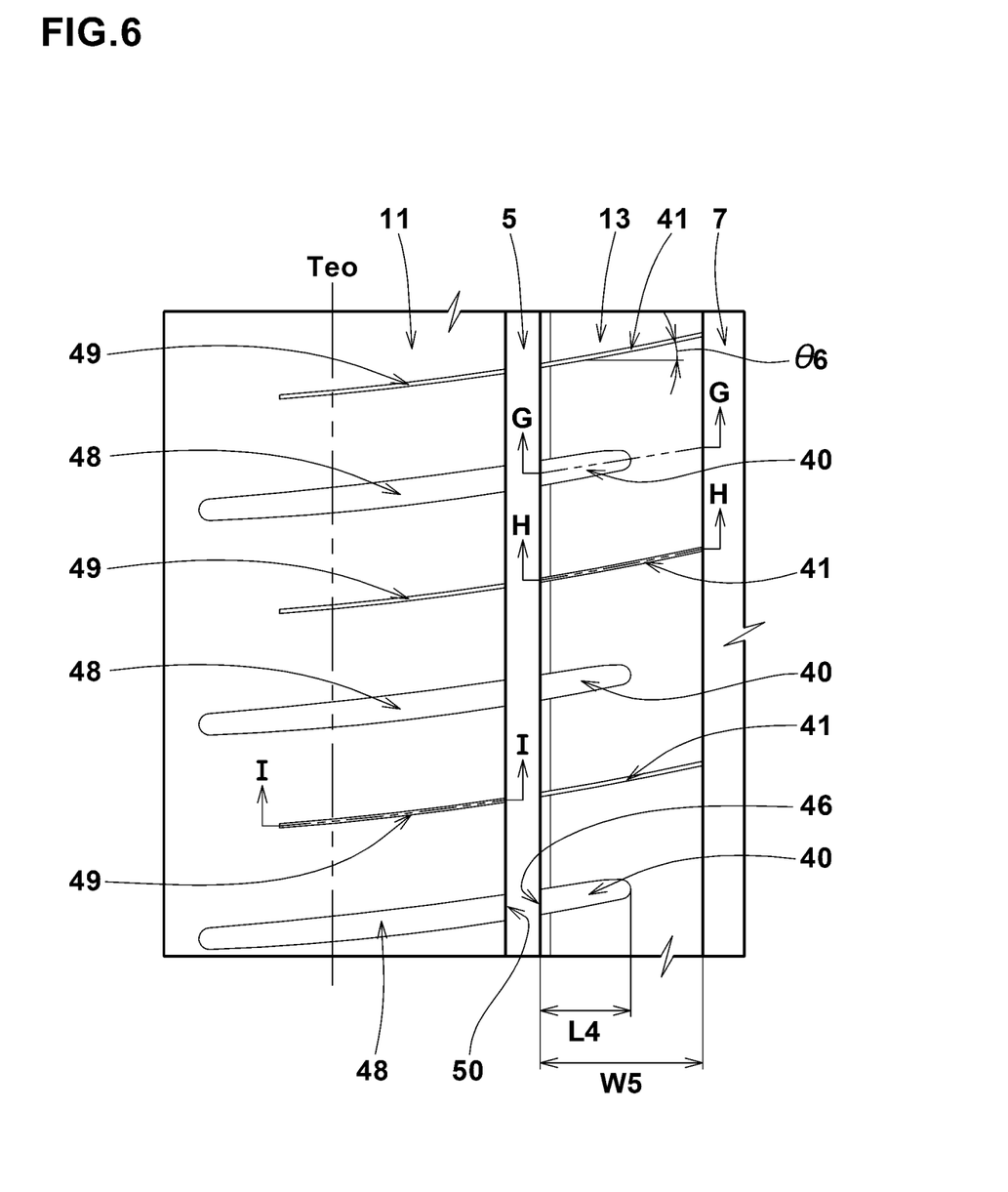
FIG. 6 is a partial top view of the outside middle land region and the outside shoulder land region in FIG. 1.

FIG. 6 shows the outside middle land region 13 and the outside shoulder land region 11.

In this embodiment, the outside middle land region 13 is provided with outside middle lateral grooves 40 and outside middle sipes 41 which are alternately arranged in the tire circumferential direction.

The outside middle lateral grooves 40 extend axially inwardly from the outside shoulder main groove 5 and terminate within the outside middle land region 13.
Preferably, the axial length L4 of the outside middle lateral groove 40 is preferably set in a range from 0.55 to 0.65 times the axial width W5 of the outside middle land region 13.
Such outside middle lateral grooves 40 enhance the drainage toward the outside shoulder main groove 5, and serve to improve the wet performance and the steering stability in a good balance.

Figure 7A:
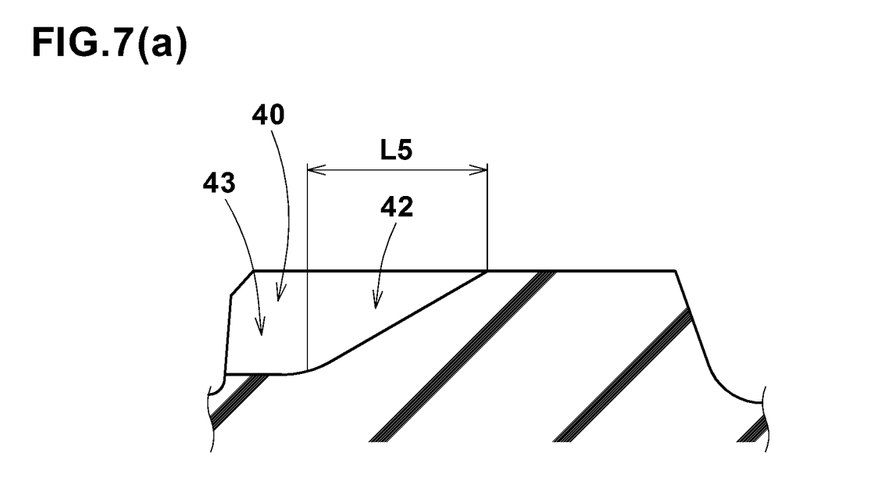
FIG. 7(a) is a cross-sectional view of a outside middle lateral groove taken along line G-G in FIG. 6.

FIG. 7(a) is a cross sectional view taken along line G-G of FIG. 6 showing the depth of the outside middle lateral groove 40. As shown, in the longitudinal direction, the outside middle lateral groove 40 comprises an axially inner portion 42 whose depth is gradually increased from the axially inner groove end toward the axially outside or toward the outside shoulder main groove 5, and an axially outer portion 43 whose depth is constant and which extends from the axially inner portion 42 to the outside shoulder main groove 5.

Such axially inner portions 42 can make a rigidity change of the outside middle land region 13 gradual.

From this point of view, the axial length L5 of the axially inner portion 42 is preferably set in a range from 0.35 to 0.45 times the axial width W5 of the outside middle land region 13.

It is preferable that the outside middle sipes 41 are inclined at an angle θ6 of from 5 to 15 degrees with respect to the tire axial direction as shown in FIG. 6.
More preferably, the outside middle sipes 41 are inclined with respect to the tire axial direction to the opposite direction to the end portions 27 of the crown sipes 25 as shown in FIG. 1. This can make the edges of these sipes to generate multidirectional frictional force.

Figure 7B:
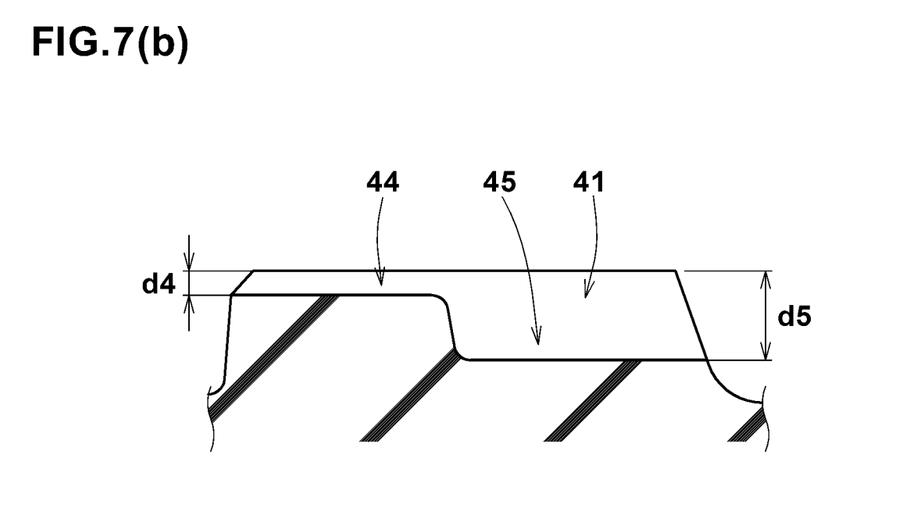
FIG. 7(b) is a cross-sectional view of a outside middle sipe taken along line H-H in FIG. 6.

FIG. 7(b) is a cross sectional view taken along line H-H of FIG. 6 showing the depth of the outside middle sipe 41. As shown, in the longitudinal direction, the outside middle sipe 41 comprises a shallow portion 44 having a depth and a deep portion 45 having a depth larger than the depth of the shallow portion 44. In this embodiment, in each of the outside middle sipes 41, the shallow portion 44 is formed on the axially outer side of the deep portion 45.

It is preferable that, in the tire axial direction, the deep portions 45 of the outside middle sipes 41 are overlapped with the axially inner portions 42 of the outside middle lateral grooves 40. More specifically, the axial extent of the deep portions 45 is at least partially overlapped with the axial extent of the axially inner portions 42. Such outside middle sipes 41 prevent the occurrence of abrupt change in the rigidity of the outside middle land region 13 and serve to achieve both of the ride comfort and the steering stability. From this point of view, it is preferred that the depth d4 of the shallow portion 44 of the outside middle sipe 41 is set in a range from 1.0 to 2.0 mm, and the depth d5 of the deep portion 45 is set in a range from 4.0 to 5.0 mm.

The outside shoulder land region 11 in this embodiment is provided with outside shoulder lateral grooves 48 and outside shoulder sipes 49 which are alternately arranged in the tire circumferential direction.

The outside shoulder lateral grooves 48 in this example extend from the outside shoulder main groove 5 to the outside tread edge Teo, and the outside shoulder lateral grooves 48 are inclined with respect to the tire axial direction to the same direction as the outside middle lateral grooved 40.
Such outside shoulder lateral grooves 48 can smoothly guide the water in the outside shoulder main groove 5 and outside middle lateral grooves 40 toward the axially outside during running in wet conditions, and it is possible to improve the wet performance.

In order to effectively derive such advantage, it is preferred that, in the tire circumferential direction, the outer end 50 on the tire equator C side, of each of the outside shoulder lateral grooves 48 is overlapped with the outer end 46 on the outside tread edge Teo side, of one of the outside middle lateral grooves 40. More specifically, the circumferential extent of the outer end 50 is at least partially overlapped with the circumferential extent of the outer end 46.

It is preferable that the outside shoulder sipes 49 are inclined with respect to the tire axial direction in the same direction as the outside middle sipes 41.
More preferably, each of the outside shoulder sipes 49 and one of the outside middle sipes 41 are arranged in a line (smoothly slightly curved line or straight line) to improve the ride comfort.

Figure 8:
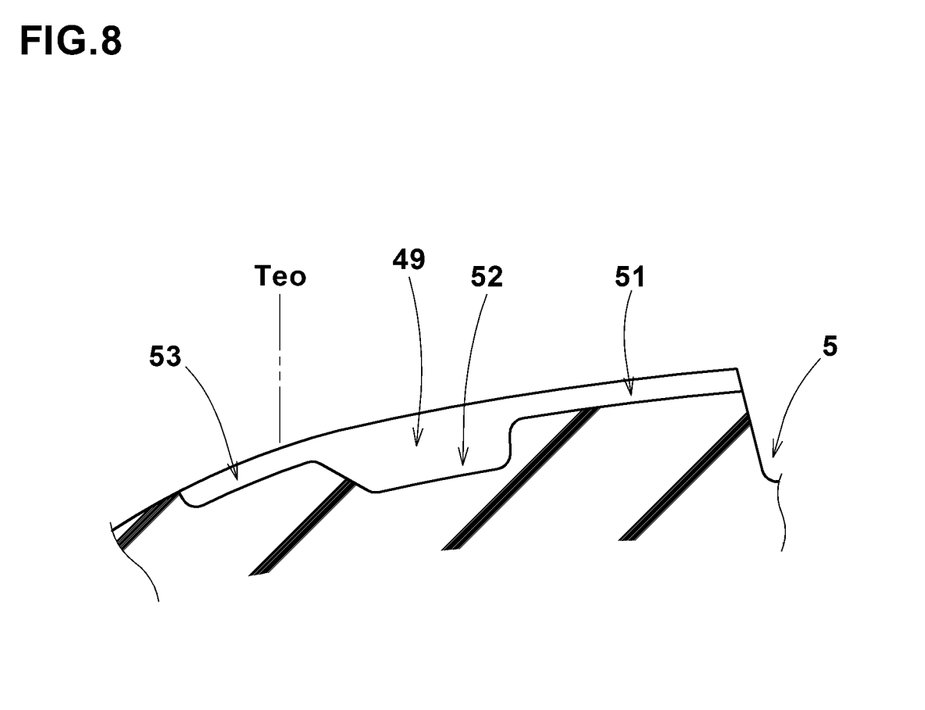
FIG. 8 is a sectional view taken along line I-I of the outside shoulder sipes in FIG. 6.

FIG. 8 is a cross-sectional view taken along line I-I of FIG. 6 showing the depth of the outside shoulder sipe 49.

As shown, in the longitudinal direction, the outside shoulder sipe 49 comprises a shallow portion 51 having a depth, and a deep portion 52 having a depth larger than the depth of the shallow portion 51.

In each of the outside shoulder sipes 49 in this embodiment, the shallow portion 51 is formed on the outside shoulder main groove 5 side of the deep portion 52.

Such outside shoulder sipes 49 can mitigate the rigidity of the outside shoulder land region 11 in an outside tread edge Teo side, while suppressing the excessive opening of the outside shoulder sipes 49 in an outside shoulder main groove 5 side, in order to improve the wandering performance.

It is preferable that the outside shoulder sipe 49 is provided with a shallow portion 53 positioned axially outside the outside tread edge Teo. Such outside shoulder sipes 49 can improve the wandering performance, while suppressing uneven wear in the vicinity of the outside tread edge Teo.

While detailed description has been made of a preferable embodiment of the present invention, the present invention can be embodied in various forms without being limited to the illustrated embodiment.

WORKING EXAMPLES

Figure 9:
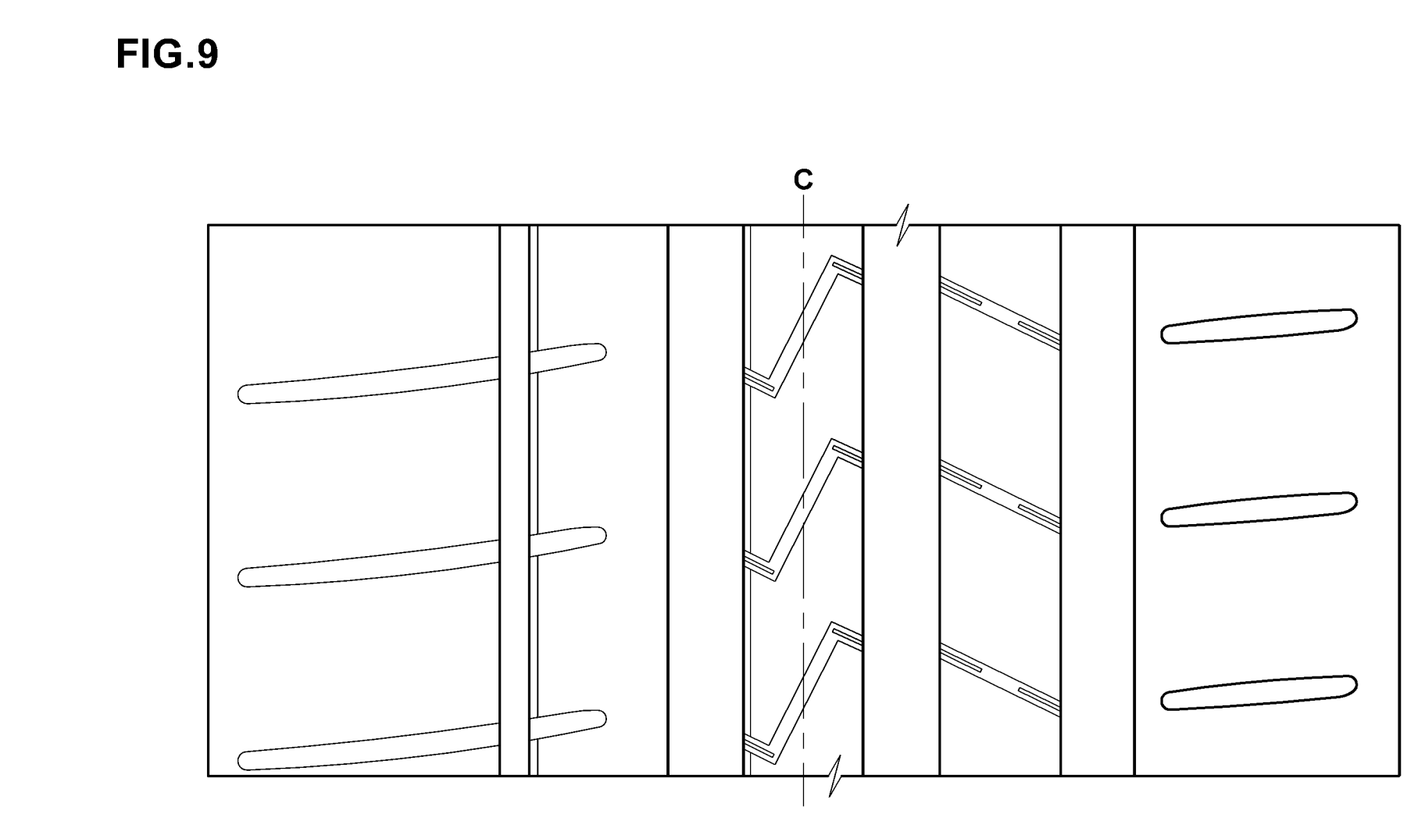
FIG. 9 is a development view of the tread portion of the pneumatic tire of comparative Example 1.

Pneumatic tires of size 225/45R17 (Rim size 17×7.5 J) were experimentally manufactured as test tires and tested for the wet performance, steering stability and riding comfort using a 2000 cc front-wheel-drive test car provided on all wheels with test tires inflated to 230 kPa. The test tires included working Examples Ex1-Ex11 and Comparative Examples Ref1-Ref2. Working Examples had tread patterns based on the tread pattern shown in FIG. 1 and having specifications listed in Table 1. Comparative Examples had tread patterns based on the tread pattern shown in FIG. 9 and having specifications listed in Table 1. In the tread pattern shown in FIG. 9, the sipes were omitted from the inside and outside shoulder land regions and the outside middle land region. Otherwise it was the same as the tread pattern shown in FIG. 1.

<Wet Performance>

The test car was run along a 100 meter radius circle on an asphalt road partially provided with a 5 mm depth 20 m long water pool, and the lateral acceleration (lateral G) during running in the water pool was measured at the front wheels, gradually increasing the speed entering into the water pool, to obtain the average for the speed range of from 50 to 80 km/h. The results are indicated in Table 1 by an index based on comparative example Ref1 being 100, wherein the larger the index number, the better the wet performance.

<Steering Stability>

The test car was run on a dry asphalt road in a test course, and the test driver evaluated steering stability.

The results are indicated in Table 1 by an index based on comparative example Ref1 being 100, wherein the larger the index number, the better the steering stability.

<Ride Comfort>

The test driver evaluated the ride comfort during the test car was run on the dry asphalt road in the test course.

The results are indicated in Table 1 by an index based on Comparative example Ref1 being 100, wherein the larger the index number, the better the ride comfort.

TABLE 1

| Tire | Ref1 | Ref2 | Ex1 | Ex2 | Ex3 | Ex4 | Ex5 |
|---|---|---|---|---|---|---|---|
| tread pattern (FIG. No.) | 9 | 9 | 1 | 1 | 1 | 1 | 1 |
| shoulder main groove width ratio W1/W2 | 0.40 | 1.00 | 0.40 | 0.20 | 0.30 | 0.50 | 0.60 |
| total width of main grooves/tread width TW | 0.27 | 0.27 | 0.27 | 0.27 | 0.27 | 0.27 | 0.27 |
| presence(P)/absence(A) of shallow portion in each sipe | P | P | P | P | P | P | P |
| wet performance | 100 | 100 | 105 | 103 | 103 | 106 | 106 |
| steering stability | 100 | 95 | 100 | 101 | 100 | 99 | 97 |
| ride comfort | 100 | 100 | 107 | 105 | 106 | 107 | 107 |

| Tire | Ex6 | Ex7 | Ex8 | Ex9 | Ex10 | Ex11 |
|---|---|---|---|---|---|---|
| tread pattern (FIG. No.) | 1 | 1 | 1 | 1 | 1 | 1 |
| shoulder main groove width ratio W1/W2 | 0.40 | 0.40 | 0.40 | 0.40 | 0.40 | 0.40 |
| total width of main grooves/tread width TW | 0.25 | 0.29 | 0.31 | 0.33 | 0.35 | 0.27 |
| presence(P)/absence(A) of shallow portion in each sipe | P | P | P | P | P | A |
| wet performance | 102 | 105 | 106 | 107 | 107 | 106 |
| steering stability | 103 | 100 | 99 | 98 | 96 | 98 |
| ride comfort | 104 | 107 | 107 | 107 | 107 | 107 |

From the test results, it was confirmed that the pneumatic tires according to the present invention were improved in the wet performance, the steering stability and the ride comfort in a good balance.

DESCRIPTION OF THE REFERENCE SIGNS 2 tread portion
3 main groove
4 land region
5 outside shoulder main groove
6 inside shoulder main groove
7 crown main groove
10 inside shoulder land region
17 inside shoulder lateral groove
20 sipe
Teo outside tread edge
Tei inside tread edge

The invention claimed is:

1. A pneumatic tire comprising a tread portion having an outside tread edge and an inside tread edge to be positioned outside and inside, respectively, with respect to a vehicle, wherein
the tread portion is provided with four main grooves extending straight continuously in the tire circumferential direction to axially divide the tread portion into five land regions,
the four main grooves are an outside shoulder main groove adjacent to the outside tread edge, an inside shoulder main groove adjacent to the inside tread edge, an inside crown main groove adjacent to the inside shoulder main groove, and an outside crown main groove adjacent to the outside shoulder main groove, and
the five land regions are an inside shoulder land region between the inside tread edge and the inside shoulder main groove, an inside middle land region between the inside shoulder main groove and the inside crown main groove, a crown land region between the inside crown main groove and the outside crown main groove, an outside middle land region between the outside crown main groove and the outside shoulder main groove, and an outside shoulder land region between the outside shoulder main groove and the outside tread edge, and
wherein
the outside shoulder main groove has a groove width smaller than groove widths of the inside shoulder main groove and the inside and outside crown main grooves,
the inside shoulder land region is provided with a plurality of inside shoulder lateral grooves extending axially inwardly from the inside tread edge and terminating within the inside shoulder land region,
each of the five land regions is provided with a plurality of sipes each extending across the entire width of the land region while having a width of less than 3 mm, and
the crown land region is provided with crown sipes each made up of a central portion inclined with respect to the tire axial direction to one direction, and an end portion extending from each end in the tire axial direction of the central portion while inclining with respect to the tire axial direction in a direction opposite to that of the central portion,
wherein
the inside middle land region is provided with inside middle sipes, and
each of the inside middle sipes extends straight while inclining to the same direction as the end portions of said crown sipes,
the inside middle land region is provided with only said inside middle sipes and not provided with any grooves, and
the crown land region is provided with only said crown sipes and not provided with any grooves.

2. The pneumatic tire according to claim 1, wherein the crown land region is provided with no grooves having a width of 3 mm or more.

3. The pneumatic tire according to claim 2, wherein a depth of said central portion is smaller than a depth of said end portion.

4. The pneumatic tire according to claim 1, wherein
the groove width of the outside shoulder main groove is not less than 0.2 times and not more than 0.6 times the groove width of the inside shoulder main groove,
the groove width of the crown main grooves is not less than 2.0 times and not more than 3.0 times the groove width of the outside shoulder main groove, and
the total of the groove widths of all of the main grooves is in a range from 0.27 to 0.33 times a tread width of the tread portion measured between the outside tread edge and the inside tread edge.

5. The pneumatic tire according to claim 1, wherein a distance in the tire axial direction from the axially inner end of each of the inside shoulder lateral grooves to the inside tread edge is not less than 0.70 times and not more than 0.85 times the width in the tire axial direction of the inside shoulder land region.

6. The pneumatic tire according to claim 1, wherein
each of the inside shoulder lateral grooves has a depth gradually decreased toward its axially outer end, and
comprises a main portion of which depth is smoothly changed, and an axially inner portion of which depth is changed rapidly in comparison with the main portion and which is positioned on the axially inside of the main portion.

7. The pneumatic tire according to claim 3, wherein
the shallow portion of the central portion of said crown sipe opens at the tread to have an opening width, and
the end portion of said crown sipe comprises
a radially outer first portion which opens at the tread to have an opening width same as the opening width of the shallow portion, and
a radially inner second portion extending radially inwardly from the first portion toward the bottom of the crown sipe while having a width smaller than the opening width of the shallow portion.

8. The pneumatic tire according to claim 1, wherein the outside shoulder land region is provided with outside shoulder sipes that are inclined with respect to the tire axial direction in the same direction as outside middle sipes disposed in the outside middle land region so that each of the outside shoulder sipes and one of the outside middle sipes are arranged in a straight line or alternatively a smoothly slightly curved line.

9. The pneumatic tire according to claim 1, wherein in each of the crown sipes, the central portion is inclined at a constant angle θ2 in a range from 60 to 70 degrees with respect to the tire axial direction, and the end portions are inclined at a constant angle θ3 in a range from 15 to 25 degrees with respect to the tire axial direction.

10. A pneumatic tire comprising:
a tread portion having an outside tread edge and an inside read edge to be positioned outside and inside, respectively, with respect to a vehicle,
wherein
the tread portion is provided with four main grooves extending straight continuously in the tire circumferential direction to axially divide the tread portion into five land regions,
the four main grooves are an outside shoulder main groove adjacent to the outside tread edge, an inside shoulder main groove adjacent to the inside tread edge, an inside crown main groove adjacent to the inside shoulder main groove, and an outside crown main groove adjacent to the outside shoulder main groove, and
the five land regions are an inside shoulder land region between the inside tread edge and the inside shoulder main groove, an inside middle land region between the inside shoulder main groove and the inside crown main groove, a crown land region between the inside crown main groove and the outside crown main groove, an outside middle land region between the outside crown main groove and the outside shoulder main groove, and an outside shoulder land region between the outside shoulder main groove and the outside tread edge, and
wherein
the outside shoulder main groove has a groove width smaller than groove widths of the inside shoulder main groove and the inside and outside crown main grooves,
the inside shoulder land region is provided with a plurality of inside shoulder lateral grooves extending axially inwardly from the inside tread edge and terminating within the inside shoulder land region,
each of the five land regions is provided with a plurality of sipes each extending across the entire width of the land region while having a width of less than 3 mm, and
the crown land region is provided with crown sipes each made up of a central portion inclined with respect to the tire axial direction to one direction, and an end portion extending from each end in the tire axial direction of the central portion while inclining with respect to the tire axial direction in, a direction opposite to that of the central portion,
wherein
the outside shoulder land region is provided with a plurality of outside shoulder lateral grooves extending between the outside tread edge and the outside shoulder main groove,
the outside shoulder land region is provided with outside shoulder sipes,
each of the outside shoulder sipes comprises a shallow portion and a deep portion having a larger depth than the shallow portion, and
in each of the outside shoulder sipes, the hallow portion is disposed on the outside shoulder main groove side of the deep portion,
wherein
the inside shoulder land region is provided with inside shoulder sipes,
each of the inside shoulder sipes comprises a shallow portion and a deep portion having a larger depth than the shallow portion, and
in each of the inside shoulder sipes, the shallow portion is disposed on the inside tread edge side of the deep portion,
wherein
the outside middle land region is provided with outside middle sipes extending from the outside shoulder main groove to the outside crown main groove,
outside middle lateral grooves extending from the outside shoulder main groove toward the outside crown main groove and terminating within the outside middle land region, and
the outside middle land region is provided with only said outside middle sipes and said outside middle lateral grooves.

11. The pneumatic tire according to claim 10, wherein
the inside middle land region is provided with inside middle sipes, and
each of the inside middle sipes extends straight while inclining to the same direction as the end portions of said crown sipes.

12. The pneumatic tire according to claim 11, wherein each said inside middle sipe comprises
an end portion connected to the inside shoulder main groove,
an end portion connected to the crown main groove, and
a central portion between the end portions and having a depth less than those of the end portions.

13. The pneumatic tire according to claim 12, wherein the length of the central portion of each said inside middle sipe is less than the length of the central portion of each said crown sipe.

14. The pneumatic tire according to claim 13, wherein the circumferential extent of the end portion on the crown land region side of each of the inside middle sipes, and the circumferential extent of the outer end on the inside middle land region side of one of the crown sipes overlap with each other in the tire circumferential direction.

15. The pneumatic tire according to claim 12, wherein
the crown land region is provided with only said crown sipes and not provided with any grooves, and
the inside middle land region is provided with only said inside middle sipes and not provided with any grooves.

16. The pneumatic tire according to claim 15, wherein the outside middle land region is provided with
outside middle sipes extending from the outside shoulder main groove to the outside crown main groove, and
outside middle lateral grooves extending from the outside shoulder main groove toward the outside crown main groove and terminating within the outside middle land region.

* * * * *